United States Patent
Akella et al.

(10) Patent No.: US 10,860,373 B2
(45) Date of Patent: Dec. 8, 2020

(54) ENHANCED GOVERNANCE FOR ASYNCHRONOUS COMPUTE JOBS

(71) Applicant: Microsoft Technology Licensing, LLC, Redmond, WA (US)

(72) Inventors: Jahnavi Akella, Redmond, WA (US); Kevin Andrew Chan, Duvall, WA (US); Shepherd Walker, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 320 days.

(21) Appl. No.: 15/290,905

(22) Filed: Oct. 11, 2016

(65) Prior Publication Data

US 2018/0101407 A1  Apr. 12, 2018

(51) Int. Cl.
*G06F 9/50* (2006.01)
*G06F 9/48* (2006.01)

(52) U.S. Cl.
CPC .......... *G06F 9/5005* (2013.01); *G06F 9/4881* (2013.01); *G06F 9/5027* (2013.01)

(58) Field of Classification Search
CPC ..... G06F 9/5005; G06F 9/4881; G06F 9/5027
See application file for complete search history.

(56) References Cited

U.S. PATENT DOCUMENTS 5,870,559 A * 2/1999 Leshem ............... G06F 11/32
709/224
6,973,651 B1 * 12/2005 Ching ............... H04L 29/06027
709/201
7,383,550 B2 6/2008 Challenger et al.
7,596,784 B2 9/2009 Abrams et al.
8,230,428 B2 7/2012 Huang
8,261,277 B2 9/2012 Prabhakar et al.
8,332,863 B2 12/2012 Zhong
8,621,477 B2 12/2013 Ferdous et al.
8,776,065 B2 7/2014 Podila
8,869,154 B1 10/2014 Hillyard et al.
2006/0161920 A1 * 7/2006 An ..................... G06F 9/485
718/102

(Continued)

FOREIGN PATENT DOCUMENTS

EP        1693748 A2       8/2006

OTHER PUBLICATIONS

"International Search Report and Written opinion issued in PCT Application PCT/US17/055008", dated Jan. 11, 2018, 10 Pages.

(Continued)

*Primary Examiner* — Emerson C Puente
*Assistant Examiner* — Jonathan R Labud

(57) ABSTRACT

Systems, methods, and software technology for governing resource utilization in a computing environment. In an implementation, a governance thread started by a job manager process identifies threads running within the job manager process and associates each of the threads with one of various jobs. The governance thread then tracks a resource utilization level of each of the jobs based on the resource utilization level of each of the threads associated with the job. When the resource utilization level of any of the jobs exceeds a threshold, the governance thread is able to shut down at least one of the threads associated with the job.

20 Claims, 8 Drawing Sheets

(56) References Cited

U.S. PATENT DOCUMENTS

| | | | |
|---|---|---|---|
| 2007/0240157 A1* | 10/2007 | Herenyi | G06F 9/485 |
| | | | 718/1 |
| 2008/0320482 A1 | 12/2008 | Dawson et al. | |
| 2014/0208331 A1* | 7/2014 | Li | G06F 9/5044 |
| | | | 718/105 |
| 2016/0128083 A1 | 5/2016 | Shakya et al. | |

OTHER PUBLICATIONS

Ejarque, et al., "SLA-Driven Semantically-Enhanced Dynamic Resource Allocator for Virtualized Service Providers", In Proceedings of Fourth IEEE International Conference on eScience, Dec. 7, 2008, pp. 8-15.

Narayanan, et al., "SLA Based Resource Allocation as a Service Provider (SaaS) in Cloud Computing Environments", In International Journal of Innovative Research in Computer and Communication Engineering, vol. 3, Issue 3, Mar. 2015, pp. 2458-2465.

Sakellariou, et al., "Service Level Agreement Based Scheduling Heuristics", Retrieved on: Jul. 14, 2016 Available at: http://www.nesc.ac.uk/talks/528/13.pdf.

* cited by examiner

ENHANCED GOVERNANCE FOR ASYNCHRONOUS COMPUTE JOBS

TECHNICAL BACKGROUND

Many computing workloads involve multiple processing jobs that run on a data set asynchronously in order to complete a given workload. As an example, an object detection workload for photos may involve a quick rendering job, an object detection job, and an object tagging job. In another example, photo deletion workloads may involve an acknowledgment job, a reference confirmation job, and a removal job.

Given the demands, workloads may be distributed across many computing resources in order to ensure that they are completed with dispatch. Jobs are initiated by a jobs manager process running on each individual computing resource to handle the workloads. Thus, the jobs manager process (a local executable) may manage multiple jobs simultaneously and in relation to multiple workloads.

Within a jobs manager process, a direct thread may be started for each job that is initiated by the jobs manager process. The direct thread may itself start various sub-threads in the context of fulfilling the job and the sub-threads may start their own threads. All of the direct threads running on a resource may related to the same or different workloads.

At times, any one job may utilize too great a share of the underlying computing resource on which it and other jobs run. This may be due to characteristics of the workload associated with the job, processing obstacles encountered by any of the threads executing on the job, or for some other reason. Such a situation may not only prevent the job from completing, but may also prevent other jobs from completing on time or at all.

OVERVIEW

Technology is disclosed herein that allows a thread or threads associated with a job to be shut down in response to over-utilization of a resource by a job.

In an implementation, a governance thread started by a job manager process identifies threads running within the job manager process and associates each of the threads with one of various jobs. The governance thread then tracks a resource utilization level of each of the jobs based on the resource utilization level of each of the threads associated with the job. When the resource utilization level of any of the jobs exceeds a threshold, the governance thread is able to shut down at least one of the threads associated with the job. In this manner, a particular job that is over-utilizing compute resources may be throttled back, thereby allowing another job or jobs dependent upon the same resource(s) to proceed.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

TECHNICAL DISCLOSURE

Technology is disclosed herein that provides enhanced governance capabilities over asynchronous compute jobs. A governance thread is disclosed that runs within a jobs manager process on a given computing resource. The governance thread monitors the resource utilization of the other threads running on the resource and derives the utilization of the resource by an asynchronous computing job from that of the threads.

If a given job is over-utilizing the computing resource, the governance thread can shut down one or more of the threads associated with the job. The threads may be sub-threads started by a direct thread or, in some cases, the threads may include a direct thread. The governance thread may learn of each thread from an operating system element and may associate them with a given job based on their relationship to a direct thread. A given thread's utilization may thus be attributed to a job, allowing the governance thread to determine the resource utilization level of the job in the aggregate.

The governance thread may evaluate the resource utilization level of each job against a threshold or other such criteria. If a job's resource utilization level meets or exceeds the threshold, the governance thread may identify a thread or threads to shut down, in order to bring the job's resource utilization level below the threshold. An example of a resource utilization level is a percentage used of a resource (e.g. CPU utilization).

A technical effect that may be appreciated from the present disclosure includes the ability to schedule distinct compute jobs on a single server, where compute resources are constrained and all work is constrained to the same process, without the need for separate processes or containers. Rather, the governance thread disclosed herein can monitor resource utilization on a per-job basis and can shut down threads as-needed to control a given job, thereby preserving and conserving resources for other jobs running on the same resource.

Figure 1:
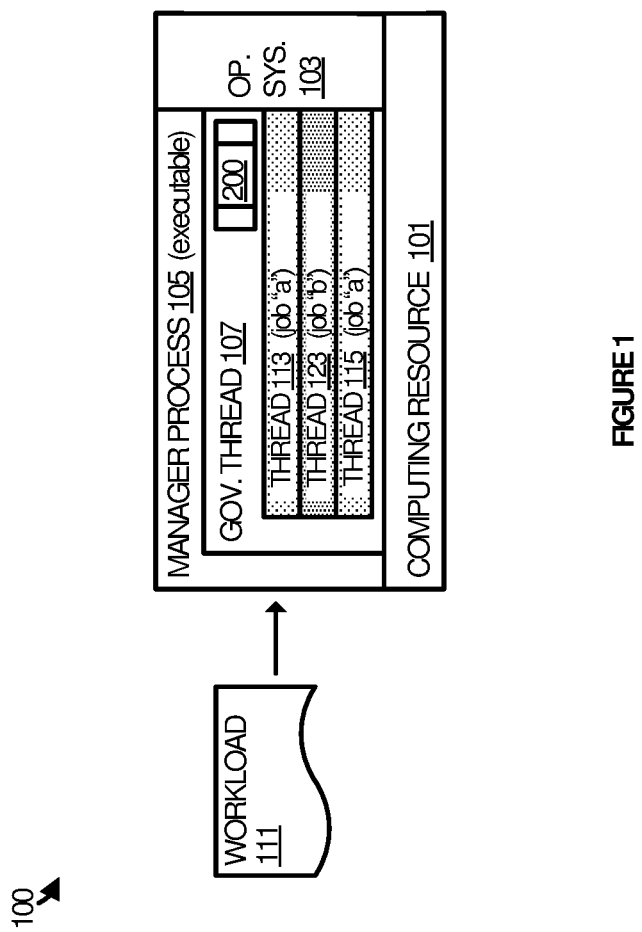
FIG. 1 illustrates an operational environment for employing enhanced governance over asynchronous compute jobs in an implementation.

FIG. 1 illustrates an operational environment 100 in an implementation of enhanced governance over asynchronous compute jobs. Operational environment 100 includes computing resource 101 on which operating system 103 and manager process 105 run. Manager process 105 is an executable process to which processing jobs may be submitted for fulfillment on computing resource 101.

Figure 8:
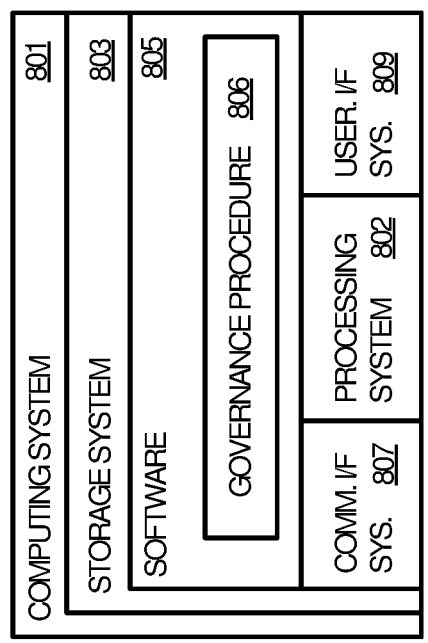
FIG. 8 illustrates a computing system suitable for implementing the enhanced governance technology disclosed herein, including any of the environments, architectures, elements, processes, and operational scenarios and sequences illustrated in the Figures and discussed below in the Technical Disclosure.

Computing resource 101 is representative of a discrete element within a computing system suitable for running an executable process (e.g. manager process 105). Examples of computing resource 101 include, but are not limited to, central processing units, graphical processing units, and application specific processors, whether physical or virtual, as well as any other type of resource. Computing system 801 in FIG. 8 is an example of a computing system that would employ such processing resources.

Manager process 105 includes a governance thread 107 for monitoring and controlling the utilization of computing resource 101 by jobs that are initiated by manager process 105 in furtherance of a workload. Governance thread 107 employs governance procedure 200 to monitor and control job utilization levels, described in more detail with respect to FIG. 2. Manager process 105 also includes various threads that may be started in furtherance of a particular job or jobs, represented by thread 113, thread 123, and thread 115. Each thread is a component of manager process 105 and shares its executable code and values of its variables.

Workload 111 is representative of one or more processing workloads that may be submitted to manager process 105 for processing. Threads 113, 123, and 115 are representative of threads that may be started within the context of manager process 105 for executing against the workload 111. Each thread may be associated with any of various jobs that manager process 105 initiates in order to process workload 111. For simplicity's sake, only workload 111 is referred to herein, although it may be appreciated that the various jobs may be initiated to handle more than one workload. In this example, thread 113 and thread 115 are associated with job "a," while thread 123 is associated with job "b."

Figure 2:
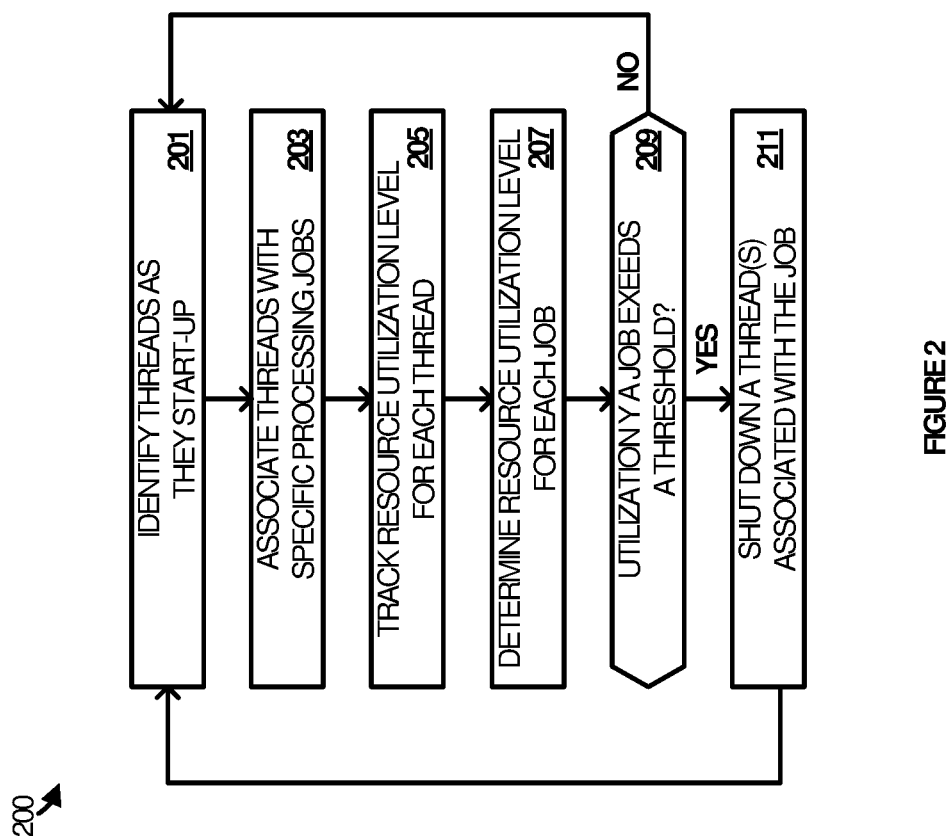
FIG. 2 illustrates a governance procedure in an implementation.

FIG. 2 illustrates governance procedure 200 in more detail, which as mentioned, may be employed by governance thread 107 to provide enhanced control over job utilization levels. Governance procedure 200 may be implemented in program instructions in the context governance thread 107, which itself may be implemented in program instructions in the context of a class, object, module, or other such components of manager process 105. The program instructions direct a suitable computing system to operate as follows.

Referring parenthetically to the steps illustrated in FIG. 2, a governance thread started by a manager process identifies other threads as they start-up (step 201). The other threads may be direct threads, sub-threads (asynchronous threads), or any other thread. The governance thread may be notified of a thread starting from an operating system element. For instance, the governance thread may query an event tracing service provided by an operating system that provides component level logging.

When a thread is started and the governance thread is notified of the event, the governance thread associates the thread with a specific processing job (step 203). The start of a direct thread represents the beginning of a job and thus may represent the job from the perspective of the governance thread. Then, as sub-threads are started by the direct thread or other sub-threads, the governance thread may associate the sub-threads with the job associated with their direct threads.

The governance thread may track the resource utilization level of each thread that is running within the manager process (step 205). Resource utilization levels may also be obtained from an operating system service capable of providing such metrics. Alternatively, the governance thread may determine utilization levels itself by monitoring start and stop times of each thread maintained in event logs. The resource utilization level of the sub-threads may be attributed to their associated jobs, thereby allowing the governance thread to determine a resource utilization level of each job (step 207).

The governance thread then determines whether the resource utilization level of any of the jobs meets and/or exceeds a threshold utilization level (step 209). If so, the governance thread identifies and shuts down one or more threads associated with the job, in order to bring the job's utilization level below the threshold (step 211). If not, then the governance thread continues to operate as specified, including continuing to identity new threads, monitor their resource utilization levels, and monitor the utilization levels of their associated jobs.

Figure 3:
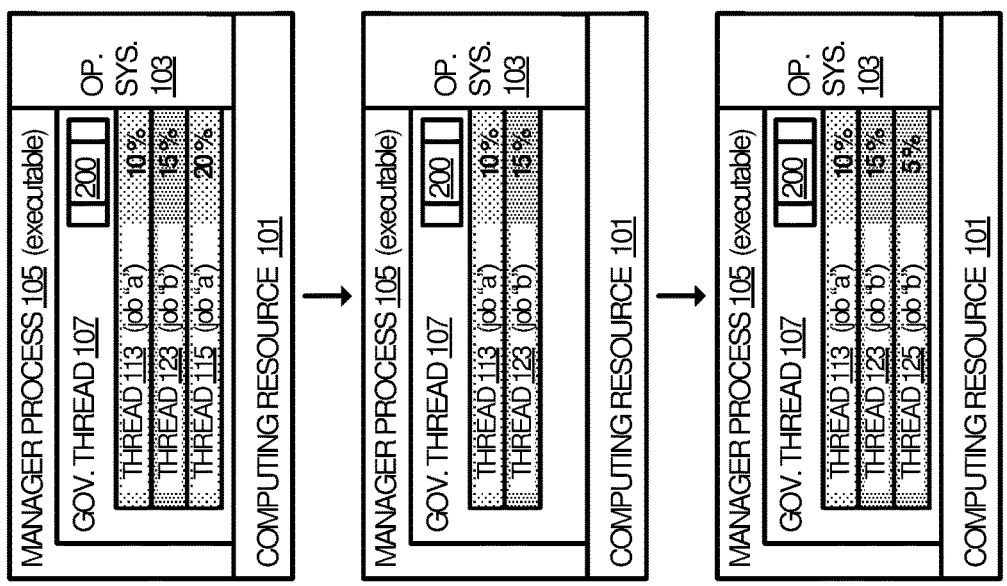
FIG. 3 illustrates an operational scenario in an implementation related to the operational environment of FIG. 1.
Figure 4:
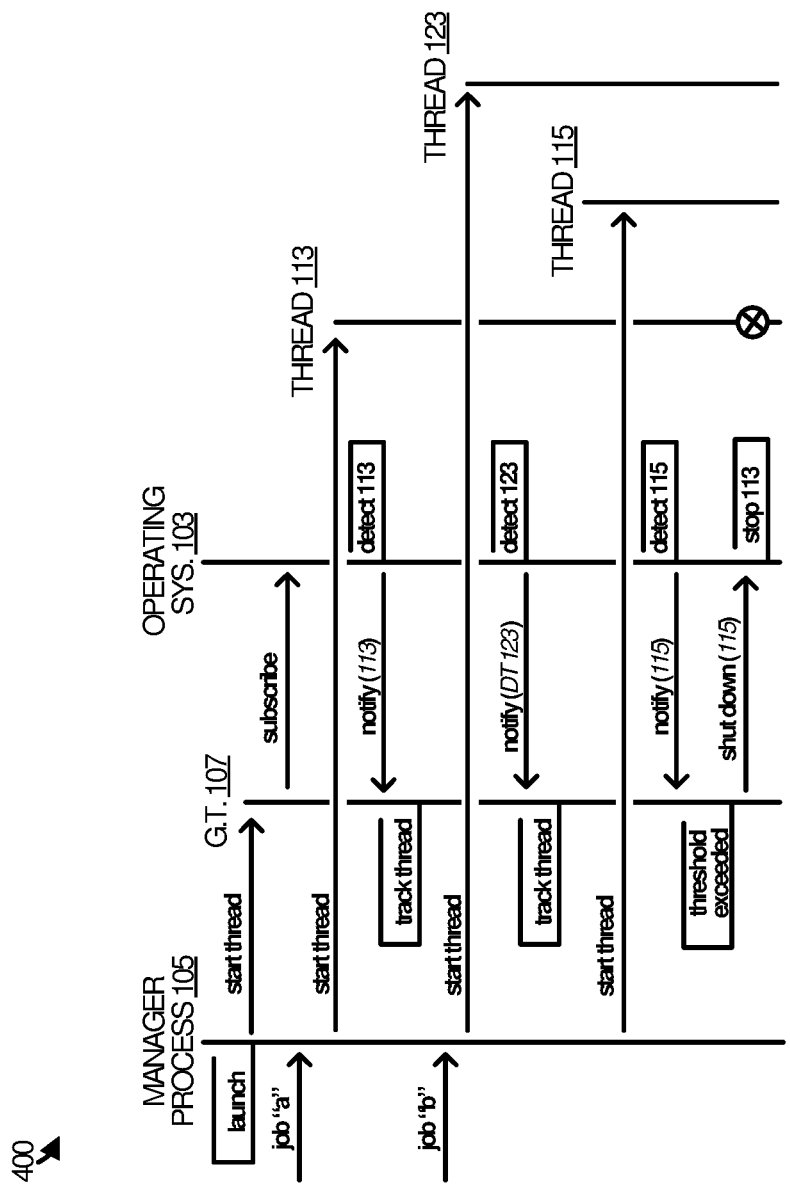
FIG. 4 illustrates an operational sequence in an implementation related to the operational environment of FIG. 1.

FIG. 3 illustrates an operational scenario in an implementation whereby governance thread 107 employs governance procedure 200. At first, thread 113, thread 123, and thread 115 are running. Thread 113 is utilizing 10% of computing resource 101, while thread 123 is utilizing 15% and thread 115 is utilizing 20%. Governance thread 107 attributes the utilization of both thread 113 and thread 115 to job (a). The utilization of thread 123 is attributed to job (b). Thus, job (a) has a utilization level of 30%, whereas job (b) has a utilization level of 15%.

It may be assumed for exemplary purposes that the threshold utilization rate for any job is 25%. In other words, no single job may utilize more than a quarter of computing resource 101. Accordingly, governance thread 107 proceeds to shut down a thread associated with job (a), which in this case is thread 115. Shutting down thread 115 brings the utilization of job (a) down to 15%. This may allow another thread to be started for another job, which is represented by thread 125 for job (b) or any other job.

Figure 5:
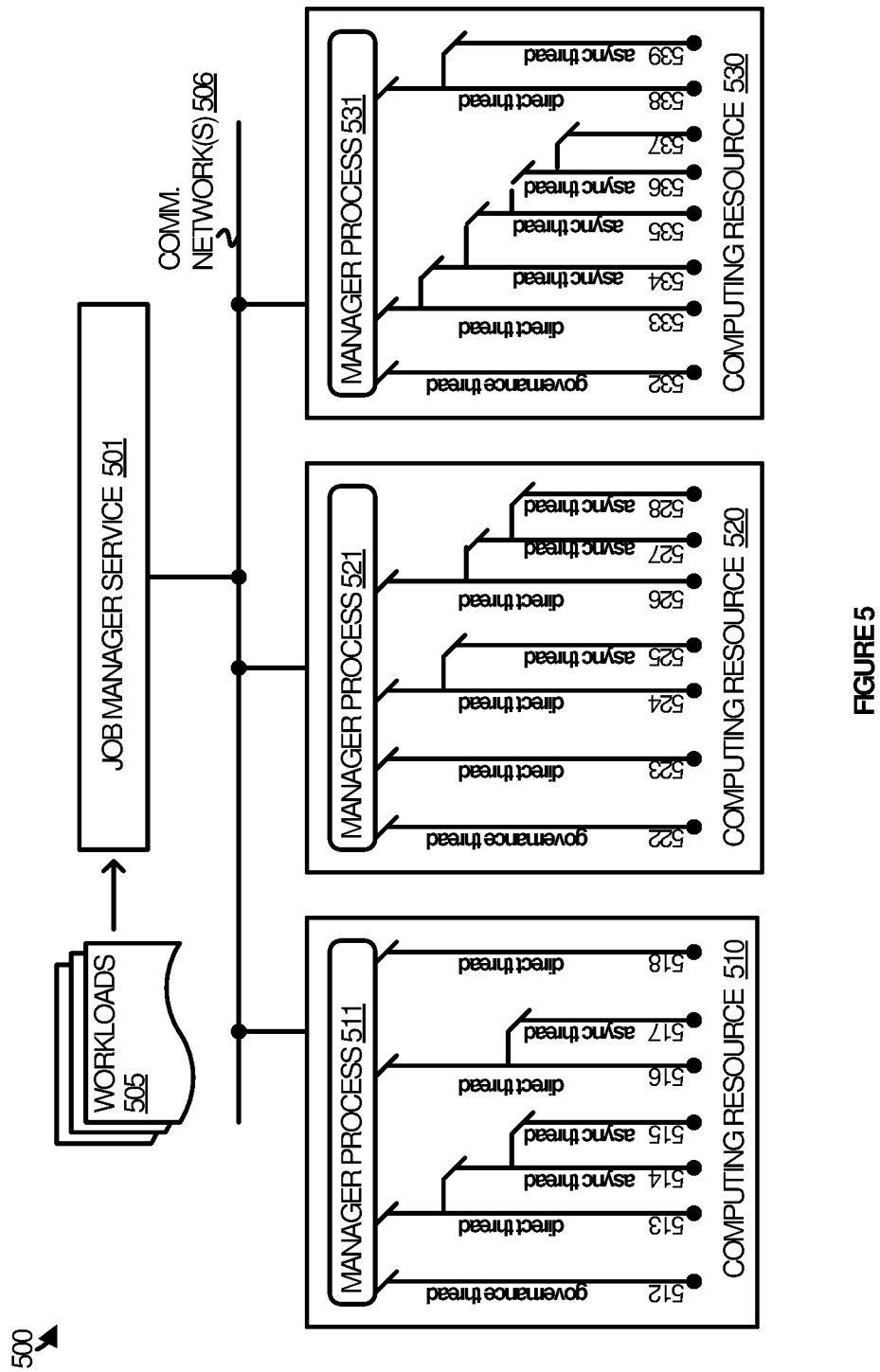
FIG. 5 illustrates another operational environment for employing enhanced governance over asynchronous compute jobs in an implementation.

FIG. 5 illustrates another operational environment 500 in an implementation of enhanced governance over asynchronous compute jobs. Operational environment 500 includes a jobs manager service 501 that distributes corresponding workloads and their corresponding jobs over multiple compute nodes. In this example, three nodes are illustrated: computing resource 510, computing resource 520, and computing resource 530. Each resource includes a manager process to manage the compute jobs locally, represented by manager process 511, manager process 521, and manager process 531 respectively. Jobs manger service 501 communicates with manager processes 511, 521, and 531 over communication network 506 and may be implemented on one or more computing systems, of which computing system 801 is representative.

Computing resources 510, 520, and 530 are representative of a discrete element within a computing system suitable for running an executable process (e g manager processes 511, 521, and 531). Examples of computing resources 510, 520, and 530 include, but are not limited to central processing units, graphical processing units, and application specific processors, whether physical or virtual, or any other type of resource. Computing system 801 in FIG. 8 is an example of a computing system that would employ such resources.

In this illustration, various workloads 505 have been submitted to jobs manager service 501 and distributed across computing resources 510, 520, and 530. Jobs are performed on the workloads by various threads that are started by manager processes 511, 521, and 531 respectively. The manager processes each start a governance thread upon starting up themselves, represented by governance thread 512, governance thread 522, and governance thread 532. Other threads are also started to handle the workloads, including various direct threads and their sub-threads, or asynchronous threads.

Each direct thread that is started by a job manager process may be considered a job. The asynchronous threads branch from a direct thread or from another asynchronous thread may be considered as part of the job being performed by their direct thread.

For example, direct thread 513 runs on computing resource 510 and has spawned asynchronous thread 514 and asynchronous thread 515. Direct thread 516 has started asynchronous thread 518, while direct thread 518 has no sub-threads. On computing resource 520, direct thread 523 has no sub-threads, while direct thread 524 has asynchronous thread 525 and direct thread 526 has asynchronous threads 527 and 528. Direct thread 533 runs on computing resource 530 with asynchronous threads 535, 536, and 537, while direct thread 538 has asynchronous thread 539.

Figure 6:
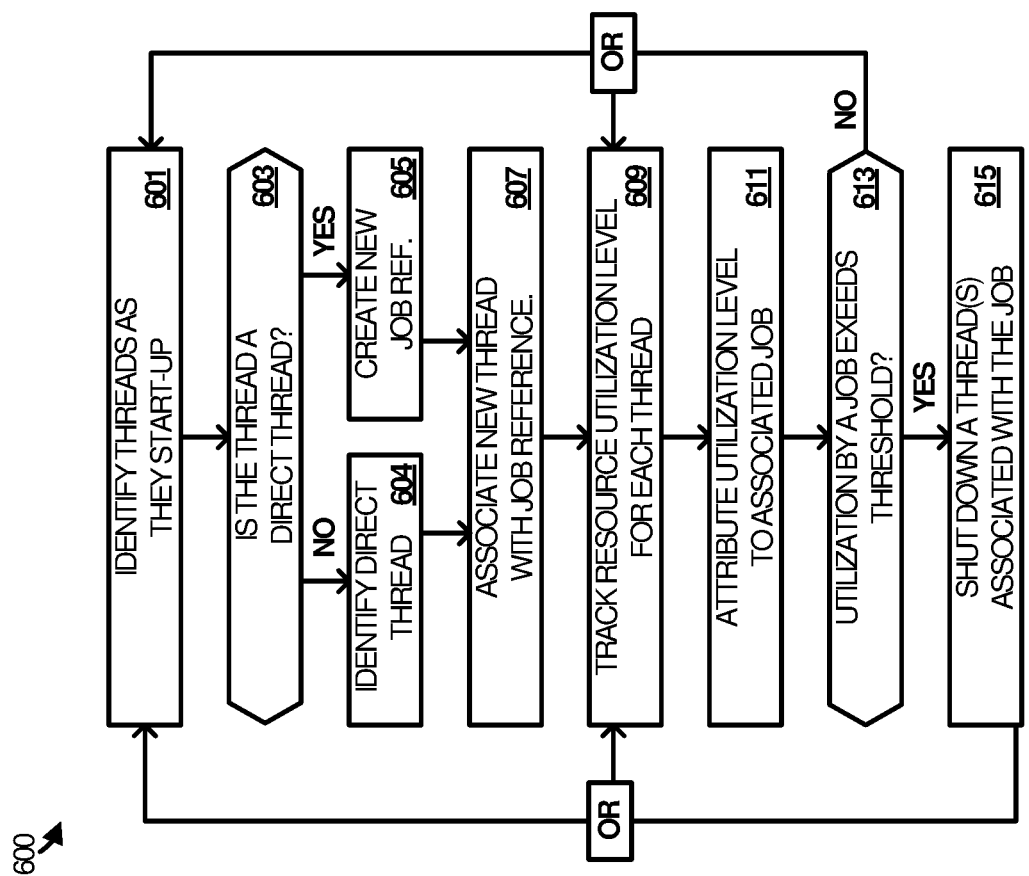
FIG. 6 illustrates another governance procedure in an implementation.

Each governance thread employs a governance procedure to provide enhanced control over job utilization levels. Governance procedure 600 in FIG. 6 is representative of such a software procedure or routine. Governance procedure 600 may be implemented in program instructions in the context a governance thread, which itself may be implemented in program instructions in the context of a class, object, module, or other such components of a manager process. The program instructions direct a suitable computing system to operate as follows.

Referring parenthetically to the steps illustrated in FIG. 6, a governance thread started by an executable job manager process identifies threads as they start up (step 601). This may involve communicating with an operating system element, such as an event tracker service, that logs or otherwise tracks when threads are stopped and started.

The governance thread determines for each new thread whether it is a direct thread (step 603). If a thread is not a direct thread, then the governance thread identifies the direct thread associated with the sub-thread (step 604) and records its existence in a table, list, or other such data structure. If a thread is a direct thread, then the governance thread records its existence in a table, list, or other such data structure (step 605). This may be accomplished by querying an event tracking service for the identity of the parent thread that started the new thread, and so on, until reaching a direct thread. A direct thread may be characterized as such by having no parent thread or only a parent thread that all other direct threads have in common.

In either case, the new thread is associated with a job (step 607) and the thread's utilization level may be tracked and monitored by the governance thread (step 609). The governance thread tracks the utilization of each thread by querying the event tracking service for start and stop times, from which the utilization level of a given thread may be derived. In other cases, the utilization level of each thread may be tracked by some other element, which may report the thread's utilization level to the governance thread.

A thread's utilization level may be attributed to the job (i.e. the direct thread) associated with the thread (step 611). Taken together, as the utilization levels of the various asynchronous threads associated with a direct thread are attributed to a job, an overall utilization level of the job may be determined. The governance thread may then determine whether the job's utilization level exceeds a threshold (step 613). If the job's utilization level exceeds the threshold, then the governance thread identifies and shuts down one or more threads under the job (step 615). If not, then the governance thread continues to track the utilization levels of sub-threads and/or monitor for new threads to start.

Figure 7:
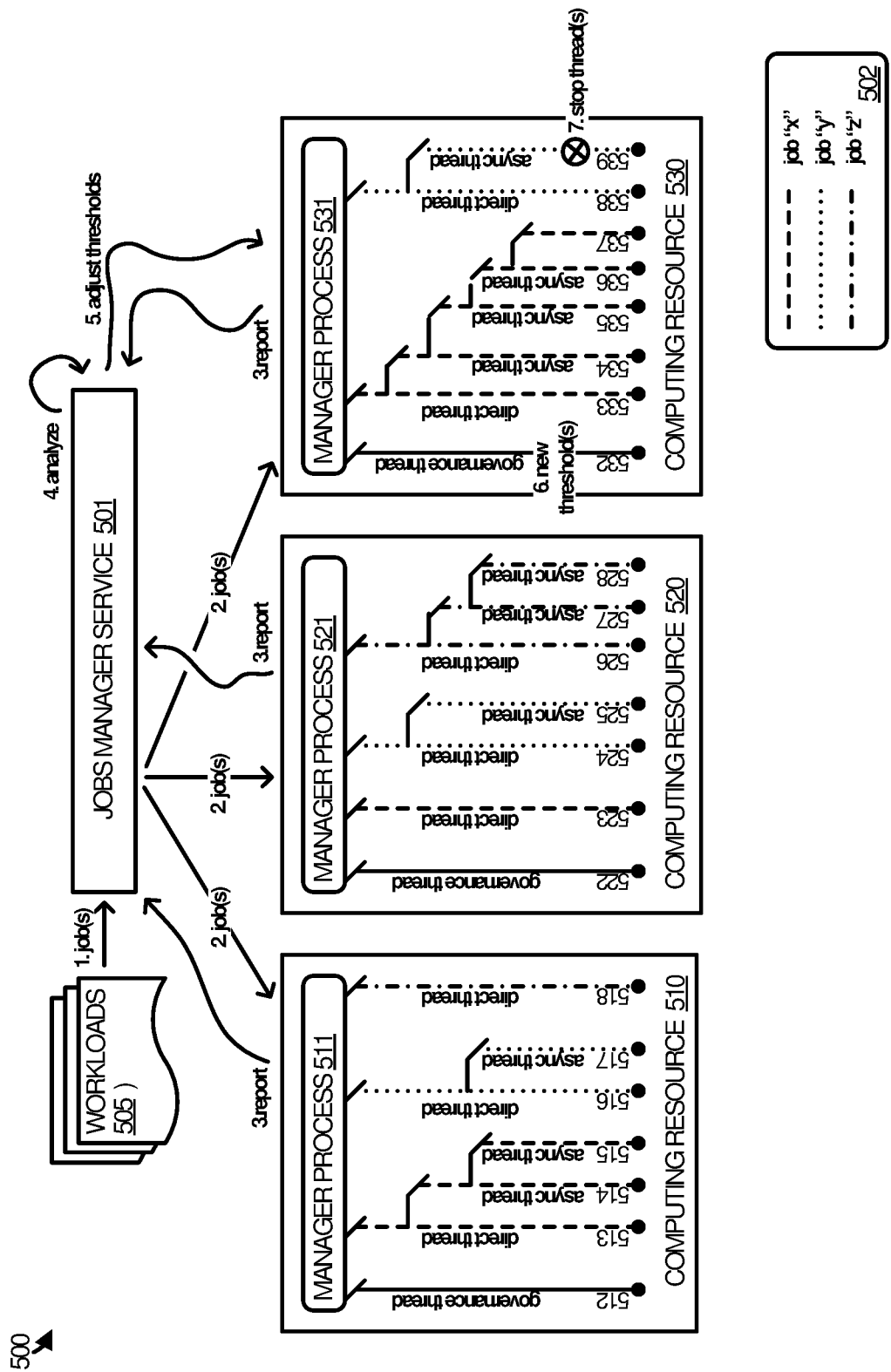
FIG. 7 illustrates an operational scenario in an implementation related to the operational environment of FIG. 5.

FIG. 7 illustrates an operational scenario pertaining to the operational environment 500 illustrated in FIG. 5. In operation, workloads 505 are introduced to be processed in a distributed manner. Jobs manager service 501 is responsible for distributing the workloads across computing resources 510, 520, and 530, as well scheduling jobs to process the workloads. To do so, jobs manager service 501 communicates with manager processes 511, 521, and 531. Jobs manager service 501 may, for example, identify the workload or portion thereof to be processed, as well as the specific job that needs to be run against the workload.

A given manager process receives a request from jobs manager service and spins up a direct thread to perform a given job against data in the workload. The direct thread may need to start additional sub-threads as part of its execution. Per the illustration in FIG. 6, the governance thread running under each manager process may monitor the direct threads and sub-threads under its manager process to ensure that a particular job does not over utilize any local processing resources.

For exemplary purposes in this scenario, three different jobs (x, y, and z) have been distributed by jobs manager service 501 across the computing resources. Each thread on the computing resources is formatted with a specific line pattern to visually denote which particular job it is associated with, as defined by legend 502. For example, direct threads, 523, and 533 and their sub-threads are associated with job (x); direct threads 516, 524, and 538 and their sub-threads are associated with job (y); and direct threads 518 and 526 and their sub-threads are associated with job (z).

Each governance thread employs governance procedure 600 (illustrated in FIG. 6) to govern the utilization of the specific resource on which the governance thread runs by the jobs submitted to that resource. The governance threads via their manager processes may report on job utilization levels to jobs manager service 501, thereby allowing jobs manager service 501 to analyze utilization levels on a per-job basis across multiple computing resources. Jobs manager service 501 may responsible adjust utilization thresholds. The governance threads may incorporate the updated thresholds into their monitoring of local job utilization levels. In this example, asynchronous thread 539 associated with job (y) is shut-down in view of the updated thresholds. This may occur, for instance, in response to a determination by jobs manager service 501 that job (y) has been given sufficient resources across all of the computing resources globally.

FIG. 8 illustrates computing system 801, which is representative of any system or collection of systems in which the various services, scenarios, and processes disclosed herein may be implemented. Examples of computing system 801 include, but are not limited to, server computers, rack servers, web servers, cloud computing platforms, and data center equipment, as well as any other type of physical or virtual server machine, container, and any variation or combination thereof. (Other examples may include smart phones, laptop computers, tablet computers, desktop computers, hybrid computers, gaming machines, virtual reality devices, smart televisions, smart watches and other wearable devices, as well as any variation or combination thereof.)

Computing system 801 may be implemented as a single apparatus, system, or device or may be implemented in a distributed manner as multiple apparatuses, systems, or devices. Computing system 801 includes, but is not limited to, processing system 802, storage system 803, software 805, communication interface system 807, and user interface system 809. Processing system 802 is operatively coupled with storage system 803, communication interface system 807, and user interface system 809.

Processing system 802 loads and executes software 805 from storage system 803. Software 805 includes governance procedure 806, which is representative of the processes discussed with respect to the preceding FIGS. 1-7, including governance procedure 200 and governance procedure 600. When executed by processing system 802 to provide enhanced governance over compute jobs, software 805 directs processing system 802 to operate as described herein for at least the various processes, operational scenarios, and sequences discussed in the foregoing implementations. Computing system 801 may optionally include additional devices, features, or functionality not discussed for purposes of brevity.

Referring still to FIG. 8, processing system 802 may comprise a micro-processor and other circuitry that retrieves and executes software 805 from storage system 803. Processing system 802 may be implemented within a single processing device, but may also be distributed across multiple processing devices or sub-systems that cooperate in executing program instructions. Examples of processing system 802 include general-purpose central processing units, application specific processors, and logic devices, as well as any other type of processing device, combinations, or variations thereof.

Storage system 803 may comprise any computer readable storage media readable by processing system 802 and capable of storing software 805. Storage system 803 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 803 may also include computer readable communication media over which at least some of software 805 may be communicated internally or externally. Storage system 803 may be implemented as a single storage device, but may also be implemented across multiple storage devices or sub-systems co-located or distributed relative to each other. Storage system 803 may comprise additional elements, such as a controller, capable of communicating with processing system 802 or possibly other systems.

Software 805 may be implemented in program instructions and among other functions may, when executed by processing system 802, direct processing system 802 to operate as described with respect to the various operational scenarios, sequences, and processes illustrated herein. For example, software 805 may include program instructions for implementing governance procedure on a governance thread within a job manager process.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 805 may include additional processes, programs, or components, such as operating system software, virtual machine software, or other application software, in addition to or that include governance procedure 806. Software 805 may also comprise firmware or some other form of machine-readable processing instructions executable by processing system 802.

In general, software 805 may, when loaded into processing system 802 and executed, transform a suitable apparatus, system, or device (of which computing system 801 is representative) overall from a general-purpose computing system into a special-purpose computing system customized to provide enhanced governance over asynchronous compute jobs. Indeed, encoding software 805 on storage system 803 may transform the physical structure of storage system 803. The specific transformation of the physical structure may depend on various factors in different implementations of this description. Examples of such factors may include, but are not limited to, the technology used to implement the storage media of storage system 803 and whether the computer-storage media are characterized as primary or secondary storage, as well as other factors.

For example, if the computer readable storage media are implemented as semiconductor-based memory, software 805 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 807 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 809 is optional and may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 809. In some cases, the input and output devices may be combined in a single device, such as a display capable of displaying images and receiving touch gestures. The aforementioned user input and output devices are well known in the art and need not be discussed at length here.

User interface system 809 may also include associated user interface software executable by processing system 802 in support of the various user input and output devices discussed above. Separately or in conjunction with each other and other hardware and software elements, the user interface software and user interface devices may support a graphical user interface, a natural user interface, or any other type of user interface.

Communication between computing system 801 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

The invention claimed is:

1. A computing apparatus comprising:
   one or more computer readable storage media;
   at least one processor operatively coupled with the one or more computer readable storage media; and
   program instructions stored on the one or more computer readable storage media and comprising an executable job manager process that, when executed by the at least one processor, directs the computing apparatus to at least:
   start a governance thread; and
   on the governance thread, and for at least a job of a plurality of jobs submitted to the executable job manager process:
   identify a plurality of threads, started by the executable job manager process, that are associated with the job;
   determine a computer resource utilization level for the job based on a computer resource utilization level for each thread of the plurality of threads; and
   in response to the computer resource utilization level for the job exceeding a threshold, shut down at least a thread of the plurality of threads.

2. The computing apparatus of claim 1 wherein to determine the computer resource utilization level for the job, the executable job manager process directs the computing apparatus to, on the governance thread and responsive to receiving a notification identifying a detected thread, commence tracking of the detected thread.

3. The computing apparatus of claim 2 wherein each thread of the plurality of threads becomes associated with the job when the executable job manager process directs the computing apparatus to, on the governance thread:
   at least identify a direct thread that started a new thread;
   identify the job; and
   associate the new thread with the job.

4. The computing apparatus of claim 3 wherein the executable job manager process further directs the computing apparatus to, on the governance thread, track the computer resource utilization level for each thread of the plurality of threads.

5. The computing apparatus of claim 1 wherein to identify the plurality of threads, the executable job manager process directs the computing apparatus to, on the governance thread, learn an identity of any new threads started within the executable job manager process by communicating with an operating system.

6. The computing apparatus of claim 1 wherein the computer resource utilization level comprises a central processing unit (CPU) utilization level.

7. The computing apparatus of claim 1 wherein the governance thread comprises a main thread initiated by the executable job manager process upon the executable job manager process starting, and wherein the executable job manager process comprises a local executable process.

8. One or more computer readable storage media having program instructions stored thereon comprising an executable job manager process that, when executed by at least one processor, directs the at least one processor to at least:
   start a governance thread; and
   on the governance thread, and for at least a job of a plurality of jobs submitted to the executable job manager process:
   identify a plurality of threads, started by the executable job manager process, that are associated with the job;
   determine a computer resource utilization level for the job based on a computer resource utilization level for each thread of the plurality of threads; and in response to the computer resource utilization level for the job exceeding a threshold, shut down at least a thread of the plurality of threads.

9. The one or more computer readable storage media of claim 8 wherein to determine the computer resource utilization level for job, the executable job manager process directs the at least one processor to, on the governance thread and responsive to receiving a notification identifying a detected thread, commence tracking of the detected thread.

10. The one or more computer readable storage media of claim 9 wherein each thread of the plurality of threads becomes associated with the job when the executable job manager process directs the at least one processor to on the governance thread:
at least identify a direct thread that started a new thread;
identify the job; and
associate the new thread with the job.

11. The one or more computer readable storage media of claim 10 wherein the executable job manager process further directs the at least one processor to, on the governance thread, track the computer resource utilization level for each thread of the plurality of threads.

12. The one or more computer readable storage media of claim 8 wherein to identify the plurality of threads, the executable job manager process directs the at least one processor to, on the governance thread, learn an identity of any new threads started within the executable job manager process by communicating with an operating system.

13. The one or more computer readable storage media of claim 8 wherein the computer resource utilization level comprises a central processing unit (CPU) utilization level.

14. The one or more computer readable storage media of claim 8 wherein the governance thread comprises a main thread initiated by the executable job manager process upon the executable job manager process starting, and wherein the executable job manager process comprises a local executable process.

15. A method of operating an executable job manager process on a computing system, the method comprising:
start a governance thread; and
on the governance thread, and for at least a job of a plurality of jobs submitted to the executable job manager process:
identifying a plurality of threads started by the executable job manager process;
associating each thread of the plurality of threads with at least the job;
determining a computer resource utilization level for the job based on a computer resource utilization level for each thread of the plurality of threads; and
in response to the computer resource utilization level for the job exceeding a threshold, shutting down at least a thread of the plurality of threads.

16. The method of claim 15 wherein determining the computer resource utilization level for the job comprises, on the governance thread and responsive to receiving a notification identifying a detected thread, commencing tracking of the detected thread.

17. The method of claim 16 wherein associating each thread of the plurality of threads with at least the job of the plurality of jobs comprises identifying a direct thread that started a new thread, identifying the job, and associating the new thread with the job.

18. The method of claim 17 further comprising tracking, on the governance thread, the computer resource utilization level for each thread of the plurality of threads.

19. The method of claim 15 wherein identifying the plurality of threads running within the executable job manager process comprises learning an identity of any new threads started within the executable job manager process by communicating with an operating system.

20. The method of claim 15 wherein the computer resource utilization level comprises a central processing unit (CPU) utilization level, wherein the governance thread comprises a main thread initiated by the executable job manager process upon the executable job manager process starting, and wherein the executable job manager process comprises a local executable process.

* * * * *